United States Patent
Chu et al.

(10) Patent No.: US 10,916,767 B2
(45) Date of Patent: Feb. 9, 2021

(54) CARBON-COATED TERNARY POSITIVE ELECTRODE MATERIAL, PREPARATION METHOD THEREFOR, AND LITHIUM ION BATTERY

(71) Applicant: GRADUATE SCHOOL AT SHENZHEN TSINGHUA UNIVERSITY, Shenzhen (CN)

(72) Inventors: Xiao-Dong Chu, Shenzhen (CN); Jian-Fu He, Shenzhen (CN); Bao-Hua Li, Shenzhen (CN); Yan-Bing He, Shenzhen (CN); Yu-Xiu Liu, Shenzhen (CN); Hong-Da Du, Shenzhen (CN); Fei-Yu Kang, Shenzhen (CN)

(73) Assignee: Graduate School at Shenzhen, Tsinghua University, Shenzhen (CN)

( * ) Notice: Subject to any disclaimer, the term of this patent is extended or adjusted under 35 U.S.C. 154(b) by 491 days.

(21) Appl. No.: 15/577,450

(22) PCT Filed: May 27, 2016

(86) PCT No.: PCT/CN2016/083632
§ 371 (c)(1),
(2) Date: Apr. 20, 2018

(87) PCT Pub. No.: WO2016/188477
PCT Pub. Date: Dec. 1, 2016

(65) Prior Publication Data
US 2018/0226639 A1   Aug. 9, 2018

(30) Foreign Application Priority Data

May 28, 2015 (CN) .......................... 2015 1 0280893

(51) Int. Cl.
*C01G 53/00* (2006.01)
*H01M 4/525* (2010.01)
(Continued)

(52) U.S. Cl.
CPC ............. *H01M 4/366* (2013.01); *C01B 32/05* (2017.08); *C01G 45/1228* (2013.01);
(Continued)

(58) Field of Classification Search
CPC ..... C01G 51/50; C01G 53/50; C01G 45/1228
See application file for complete search history.

(56) References Cited

U.S. PATENT DOCUMENTS 6,383,235 B1 * 5/2002 Maegawa .......... C01G 45/1242
29/623.5

FOREIGN PATENT DOCUMENTS

CN        100342570 C    * 10/2007
CN        101504981 A       8/2009
(Continued)

OTHER PUBLICATIONS

Machine translation of CN 103474628, Dec. 2013.*
Machine translation of CN 101504981, Aug. 2009.*

*Primary Examiner* — Jonathan Crepeau
(74) *Attorney, Agent, or Firm* — ScienBiziP, P.C.

(57) ABSTRACT

A method for preparing a carbon-coated ternary positive electrode material has steps of preparing a ternary positive electrode material precursor, and preparing a suspension of the ternary positive electrode material precursor. Lithium acrylate is added to the suspension of the ternary positive electrode material precursor according to the molar ratio of Li:(Ni+Co+Mn) being 1.03-1.05:1. Ammonium persulphate is added to the lithium acrylate-containing suspension of the ternary positive electrode material precursor, so that the lithium acrylate undergoes a polymerisation reaction and a suspension of a lithium polyacrylate-coated ternary positive electrode material precursor is obtained. The suspension of the lithium polyacrylate-coated ternary positive electrode material precursor is dried to obtain spherical particles. The lithium polyacrylate-coated ternary positive electrode mate-
(Continued)

Carbon coating layer rial precursor particles are sintered to obtain a carbon-coated ternary positive electrode material.

7 Claims, 6 Drawing Sheets

(51) Int. Cl.
| | |
|---|---|
| *H01M 4/505* | (2010.01) |
| *H01M 4/62* | (2006.01) |
| *C01G 51/00* | (2006.01) |
| *C01G 45/12* | (2006.01) |
| *H01M 4/36* | (2006.01) |
| *C01B 32/05* | (2017.01) |
| *H01M 10/0525* | (2010.01) |
| *H01M 4/04* | (2006.01) |
| *H01M 4/1391* | (2010.01) |
| *H01M 4/02* | (2006.01) |

(52) U.S. Cl.
CPC ............ *C01G 51/50* (2013.01); *C01G 53/50* (2013.01); *H01M 4/0471* (2013.01); *H01M 4/1391* (2013.01); *H01M 4/505* (2013.01); *H01M 4/525* (2013.01); *H01M 4/625* (2013.01); *H01M 10/0525* (2013.01); *C01P 2002/72* (2013.01); *C01P 2004/03* (2013.01); *C01P 2004/04* (2013.01); *C01P 2004/32* (2013.01); *C01P 2004/80* (2013.01); *C01P 2006/40* (2013.01); *H01M 2004/028* (2013.01); *Y02E 60/10* (2013.01)

(56) References Cited

FOREIGN PATENT DOCUMENTS

| | | | |
|---|---|---|---|
| CN | 103474628 | A | 12/2013 |
| CN | 104882589 | A | 9/2015 |

\* cited by examiner

FIG. 1

Secondary particles of the ternary positive electrode material

FIG. 2

Primary particles of the ternary positive electrode material

CARBON-COATED TERNARY POSITIVE ELECTRODE MATERIAL, PREPARATION METHOD THEREFOR, AND LITHIUM ION BATTERY

CROSS-REFERENCE TO RELATED APPLICATIONS

This application claims priority to Chinese Patent Application No. 201510280893.4 filed on May 28, 2015, the contents of which are incorporated by reference herein.

FIELD

The disclosure relates to a method for preparing a carbon-coated ternary positive electrode material, a carbon-coated ternary positive electrode material, and a lithium ion battery containing the carbon coated ternary cathode material.

BACKGROUND

Lithium-ion batteries are widely used in laptops, mobile phones, digital cameras, and electric vehicles. The positive material, as a component of the battery, plays an important role in the performance of the battery. At present, ternary positive material $LiNi_{1-x-y}Co_xMn_yO_2$ has distinct ternary synergistic effect, forming a three-phase solid solution system of $LiCoO_2/LiNiO_2/LiMnO_2$. It balances the advantages of $LiCoO_2$, $LiNiO_2$, and $LiMnO_2$, and at the same time can overcome to a certain extent certain individual drawbacks of the three materials. $LiNi_{1-x-y}Co_xMn_yO_2$ has a more stable structure and is easier to prepare compared with $LiNiO_2$ and $LiMnO_2$, and it is less susceptible to Jahn-Teller distortion compared with spinel $LiMn_2O_4$. It has high voltage platform, high conductivity, high vibration density, and other advantages compared with $LiFePO_4$.

At present, the industrial synthesis of ternary positive materials mainly adopts the high temperature solid phase method. The high temperature solid phase method is simple and easy to control and is the main preparation method used in the current industrialization. However, the high temperature in the preparation process consumes a lot of energy. In addition, the materials can mix unevenly and the particle size of ternary positive materials is difficult to control in the high temperature solid phase process, resulting in the uneven performance across each batch of products. The ternary positive electrode material is usually modified to better exert its properties. For example, ternary positive electrode material is coated by carbon to improve the electrical conductivity and optimize the charge-discharge performance rates of ternary positive electrode material. In the existing battery fabrication process, particle-type conductive carbon and particle-type positive electrode materials are often mechanically mixed by ball milling. This method suffers from poor contact resulting between the carbon and the positive electrode material, so that the electrons do not migrate smoothly, affecting the performance rates of the battery containing the material. In addition, the ball milling process consumes time and energy. The preparation of non-mechanically mixed carbon-coated ternary cathode materials is also very complicated.

SUMMARY OF THE INVENTION

A method for preparing a carbon-coated ternary positive electrode material is presented that achieves carbon coating by in-situ polymerization of lithium acrylate. This process is simple in preparation, and has advantages of low energy consumption and environmental protection.

In addition, it is also necessary to provide a carbon-coated ternary positive electrode material prepared by the above method and a battery containing the carbon-coated ternary positive electrode material.

In a method for preparation of a carbon-coated ternary positive electrode material, chemical formula of ternary positive electrode material is $LiNi_{1-x-y}Co_xMnyO_2$, wherein $0<x\leq 0<y\leq 0.3$. The preparation method includes the steps of preparing nickel-cobalt-manganese coprecipitate as a ternary positive electrode material precursor by reacting nickel salt, cobalt salt, and manganese salt as raw materials. A suspension of the ternary positive electrode material precursor is prepared, the mass percentage concentration of the ternary positive electrode material precursor in the suspension being 5%-30%. Lithium acrylate is added to the suspension of the ternary positive electrode material precursor according to the molar ratio of Li:(Ni+Co+Mn) being 1.03-1.05:1; at a temperature of 50° C.-80° C. Ammonium persulphate is added to the lithium acrylate-containing suspension of the ternary positive electrode material precursor, so that the lithium acrylate undergoes a polymerisation reaction and a suspension of a lithium polyacrylate-coated ternary positive electrode material precursor is obtained. The mass of the ammonium persulphate is 2%-10% of the mass of the lithium acrylate, and the reaction time is 5-8 hours. The suspension of the lithium polyacrylate-coated ternary positive electrode material precursor is dried to obtain spherical particles. The lithium polyacrylate-coated ternary positive electrode material precursor particles are sintered to obtain a carbon-coated ternary positive electrode material.

A carbon-coated ternary positive electrode material prepared by the above preparation method is obtained.

A lithium ion battery includes a positive electrode, said electrode to include a carbon-coated ternary positive electrode material prepared as described above.

In the preparation method of the carbon-coated ternary positive electrode material of the disclosure, the lithium polyacrylate is used as a lithium source and a carbon source simultaneously, and a ternary positive electrode material is obtained after sintering. The ternary positive electrode material is coated with carbon to prevent excessive growth of the ternary positive electrode particles, and a large number of pores are formed in the carbon-coated ternary positive electrode material. This greatly improves the specific surface area of the carbon-coated ternary positive electrode material, thereby improving the electrochemical performance of the carbon-coated ternary positive electrode material. In addition, the preparation is simple and does not require ball milling, so saving energy consumption. The carbon-coated ternary positive electrode material does not generate impurities during the preparation process, it is environmentally friendly and saves the processing cost of liquid or residue waste.

DETAILED DESCRIPTION

A method for preparing a carbon-coated ternary positive electrode material used in a positive electrode of lithium-ion battery is disclosed. The ternary positive electrode material is lithium nickel-cobalt-manganese oxide, and its chemical formula is $LiNi_{1-x-y}Co_xMnyO_2$, wherein $0<x\leq0<y\leq0.3$, and the preparation method includes the following steps:

Step S1, preparing nickel-cobalt-manganese coprecipitate $Ni_{1-x-y}Co_xMn_y(OH)_2$ as a ternary positive electrode material precursor by reacting nickel salt, cobalt salt, and manganese salt as raw materials.

Step S2, preparing a suspension of the ternary positive electrode material precursor, wherein the mass percentage concentration of the ternary positive electrode material precursor in the suspension is 5%-30%. When the content of the ternary positive electrode material precursor in the suspension is less than 5%, the yield of the prepared carbon-coated ternary positive electrode material is low, thereby lowering economic efficiency. When it is higher than 30%, the excessive amount of precursor content adversely affects the drying later.

Step S3, adding lithium acrylate to the suspension of the ternary positive electrode material precursor according to the molar ratio of Li:(Ni+Co+Mn) being 1.03-1.05:1. Since a part of lithium is lost during the subsequent sintering process, the molar ratio of Li:(Ni+Co+Mn) added is slightly larger than 1, however, the molar ratio of Li:(Ni+Co+Mn) is preferably not to be greater than 1.05:1, to avoid excessive lithium content affecting the final electrochemical performance of the carbon-coated ternary cathode material.

Step S4, at a temperature of 50° C.-80° C., adding ammonium persulphate as initiator for polymerizing lithium acrylate to the lithium acrylate-containing suspension of the ternary positive electrode material precursor, and stirring to make the lithium acrylate undergo a polymerisation reaction. A suspension of a lithium polyacrylate-coated ternary positive electrode material precursor is thereby obtained. The mass of the ammonium persulphate is 2%-10% of the mass of the lithium acrylate, the reaction time is 5-8 hours.

Step S5, drying the suspension of the lithium polyacrylate-coated ternary positive electrode material precursor, and obtaining spherical lithium polyacrylate-coated ternary positive electrode material precursor particles.

Step S6, sintering the lithium polyacrylate-coated ternary positive electrode material precursor particles, and obtaining a carbon-coated ternary positive electrode material. During the sintering process, the lithium in the lithium polyacrylate diffuses uniformly in the ternary positive electrode material precursor to obtain the ternary positive electrode material $LiNi_{1-x-y}Co_xMn_yO_2$, and the carbon in the lithium polyacrylate is coated on the ternary positive electrode material particles. Thereby, the carbon-coated ternary positive electrode material is finally obtained.

In step S1 of the present embodiment, a specific step of preparing a ternary positive electrode material precursor is as follows. A nickel salt, a cobalt salt, and a manganese salt are prepared into an aqueous metal salt solution according to a molar ratio of Ni:Co:Mn=(1−xy):x:y, wherein $0<x\leq0.4$, $0<y\leq0.3$, and the concentration of the aqueous metal salt solution is 0.01 mol/L~1 mol/L. A surfactant is added to the aqueous metal salt solution, wherein the mass of the surfactant is 1% to 10% of the mass of $Ni_{1-x-y}Co_xMny(OH)_2$ synthesized from the aqueous metal salt solution. At a temperature of 25° C. to 50° C. and under inert gas protection, the metal salt solution with the added surfactant, a sodium hydroxide solution, and an ammonia solution are slowly added to the reaction vessel through a peristaltic pump to react and obtain coprecipitate of nickel, cobalt, and manganese, wherein the molar ratio of each component is $(Ni^{2+}+Co^{2+}+Mn^{2+})$. $OH^-:NH^{4+}=1:2:2$, and the reaction time is 2 to 12 hours. The coprecipitate was washed with deionized water or ethanol to obtain a ternary positive electrode material precursor. In other embodiments, the sodium hydroxide solution and the ammonia solution can be mixed formulated into a mixed solution, and then the solution of the metal salt with the added surfactant and the mixed solution are slowly added to the reaction vessel simultaneously through a peristaltic pump. In the mixed solution, the concentration of sodium hydroxide is 0.02 mol/L to 2 mol/L, and the concentration of ammonia water is twice that of sodium hydroxide.

The nickel salt may be selected from one or more of nickel sulfate, nickel acetate, and nickel nitrate. The cobalt salt may be selected from one or more of cobalt sulfate, cobalt acetate, and cobalt nitrate. The manganese salt may be selected from one or more of manganese sulfate, manganese acetate, and manganese nitrate.

The surfactant may be selected from one or more of polyvinylpyrrolidone, polyethylene glycol, and cetyltrimethylammonium chloride.

When the solution of the metal salt with the surfactant, the sodium hydroxide solution and the ammonia solution are slowly added to the reaction vessel by the peristaltic pump, the reaction vessel may be sonicated to allow the solution to mix uniformly and to make the precipitate more uniform in particle size, wherein the ultrasonic frequency can be 30 KHz-100 KHz.

In step S4 of the present embodiment, lithium polyacrylate is formed by in-situ polymerization of lithium acrylate, and the ternary positive electrode precursor particles are coated with lithium polyacrylate, so that the lithium polyacrylate coating is more uniform. That is, the carbon in the subsequent carbon-coated ternary positive electrode material is also more evenly coated.

In step S5 of the present embodiment, the drying method is spray drying. The use of spray drying to dry the suspension of the ternary positive electrode material precursor coated with lithium acrylate promotes efficiency. In addition, the spray drying allows the lithium polyacrylate-coated ternary positive electrode material precursor in the suspension of the ternary positive electrode material precursor coated with lithium acrylate to be uniformly agglomerated, and to obtain more uniform and spherical lithium polyacrylate-coated ternary positive electrode precursor secondary particles. Thus, the secondary particles of the carbon-coated ternary positive electrode material obtained by the subsequent sintering are spherical and the particle size of the secondary particles is more uniform.

In step S6 of the present embodiment, lithium polyacrylate-coated ternary positive electrode precursor particles are pre-sintered in inert gas atmosphere at a temperature of 300° C. to 500° C. for 3 to 12 hours, and then sintered in air and at a temperature of 700° C. to 1000° C. for 12 to 24 hours. Thereby, a carbon-coated ternary positive electrode material is obtained. In step S6, the precursor particles of the ternary positive electrode material coated with lithium polyacrylate are pre-sintered under an inert gas and at a relatively low temperature to obtain carbon, and to harden and coat the ternary positive electrode material so as to prevent excessive growth of the ternary positive electrode material particles. Simultaneously, sintering at a lower temperature ensures uniform diffusion of lithium in the ternary positive electrode material precursor. The subsequent sintering at a higher temperature in air causes oxidation of nickel, cobalt, and manganese in the precursor of the ternary positive electrode material. At the same time, the carbon sintered at a low temperature is then partially decomposed at a high temperature, leaving a large number of pores on the particles. The specific surface area of the carbon-coated ternary positive electrode material is greatly improved, thereby improving the electrochemical properties of the carbon-coated ternary positive electrode material. The carbon-coated ternary positive electrode material obtained in step S6 is in the form of secondary particles.

The preparation method of carbon-coated ternary positive electrode material is simple and does not require ball milling, thereby reducing energy consumption. The carbon-coated ternary positive electrode material does not generate impurities in the production process, thus steps to remove impurities are not required. The production process is simplified, so it is environmentally friendly and saves the processing cost of waste liquid or waste residue. The lithium polyacrylate coated with the ternary positive electrode material precursor obtained after the polymerization reaction of the above step S4 can reduce further agglomeration between the ternary positive electrode material precursor particles. Lithium polyacrylate serves as a lithium source and a carbon source at the same time, and a ternary positive electrode material is obtained by sintering. The ternary positive electrode material is coated with carbon at the above step S6, which inhibits the agglomeration of the primary particles of the ternary positive electrode material to some extent. The carbon-coated ternary positive electrode material prepared by the above method has a primary particle size of several hundred nanometers, and a secondary particle size of several micrometers. Such particles are of a regular shape, good dispersibility, and a uniform particle size distribution. In addition, the pores formed by partial decomposition of the carbon of the ternary positive electrode material when sintered at a higher temperature are favorable for the entry of the electrolyte in the battery, so as to increase the contact area between the ternary positive electrode material and the electrolyte. The electrochemical performance of battery is thus improved. The carbon-coated ternary positive electrode material prepared by the above method has a larger specific surface area of the secondary particles, which is favorable for improving the cycle life and performance rates of the battery using the carbon-coated ternary positive electrode material.

In a first embodiment, nickel sulphate, cobalt sulphate, and manganese sulphate are mixed with water in accordance with the molar ratio of Ni:Co:Mn=1:1:1 to prepare a 300 mL metal salt aqueous solution with concentration of 0.01 mol/L.

Polyvinyl pyrrolidone is added to the above aqueous metal salt solution, and the solution is stirred until polyvinyl pyrrolidone is completely dissolved. Wherein, the mass of polyvinyl pyrrolidone is 1% of the mass of $Ni_{1-x-y}Co_xMn_y(OH)_2$ synthesized from the metal salt aqueous solution.

A mixed solution of 300 mL of sodium hydroxide and ammonia water is prepared. The concentration of sodium hydroxide in the mixed solution is 0.02 mol/L, and the concentration of ammonia water is 0.04 mol/L.

At a temperature of 30° C. and under argon protection, the metal salt solution with polyvinyl pyrrolidone, the mixed solution of sodium hydroxide solution and ammonia water are slowly added in a reaction vessel by a peristaltic pump to react for 12 hours, and obtaining a nickel-cobalt-manganese coprecipitate.

The nickel-cobalt-manganese coprecipitate is washed with deionized water to obtain a ternary positive electrode material precursor.

The ternary positive electrode material precursor is formulated into a suspension of 200 mL of a ternary positive electrode material precursor, wherein the mass percentage concentration of the ternary positive electrode material precursor in the suspension is 8%.

Stir the suspension of the ternary positive electrode material precursor, and add lithium acrylate to the suspension of the ternary positive electrode material precursor at a molar ratio of Li:(Ni+Co+Mn)=1.05:1.

Add ammonium persulfate to the suspension of the ternary positive electrode material precursor with lithium acrylate at a temperature of 50° C., and then stir the suspension, so that the lithium acrylate undergoes a polymerisation reaction for 8 hours. Thus a suspension of a lithium polyacrylate-coated ternary positive electrode material precursor is obtained, wherein the mass of ammonium persulfate is 2% of the mass of lithium acrylate.

Dry the suspension of the lithium polyacrylate-coated ternary positive electrode material precursor, and obtain spherical lithium polyacrylate coated ternary positive electrode material precursor particles.

Sinter lithium polyacrylate-coated ternary positive electrode material precursor particles under argon gas at a temperature of 400° C. for 3 hours, and then sinter in the air at a temperature of 700° C. for 12 hours, to obtain a carbon-coated ternary positive electrode material.

Figure 1:
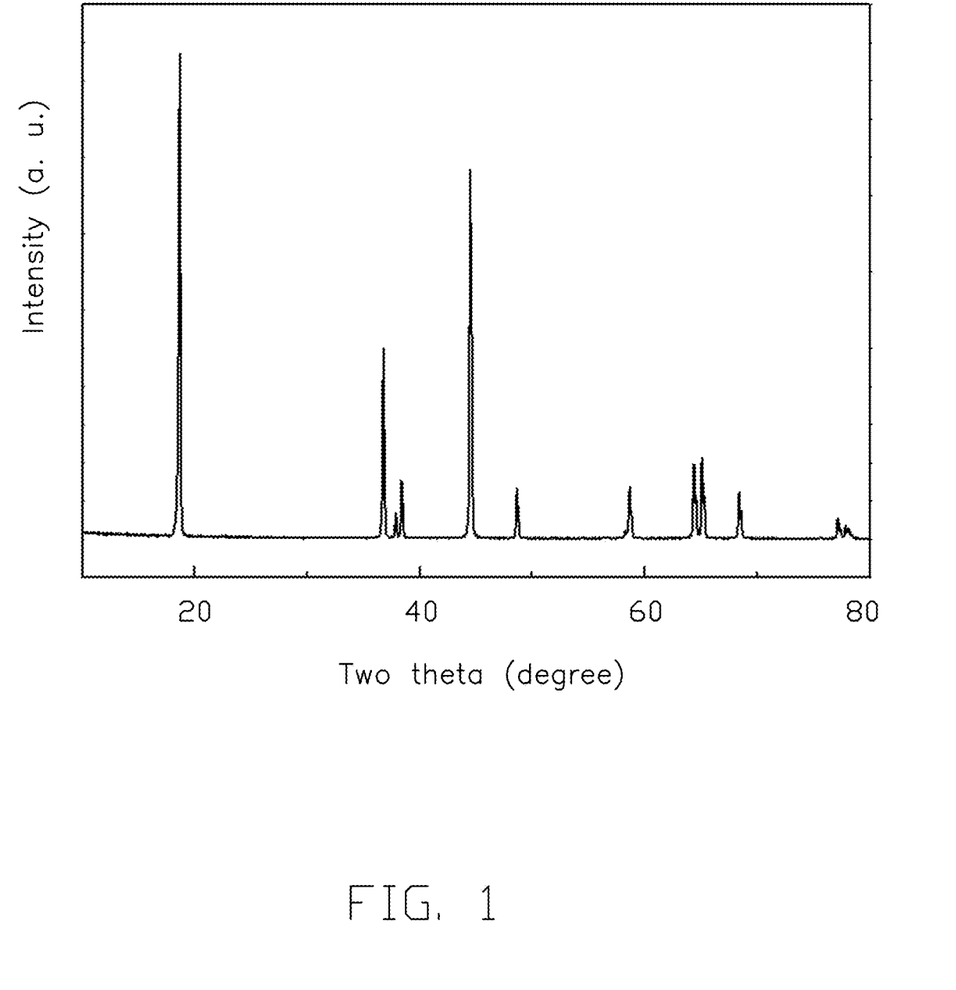
FIG. 1 is an XRD spectrum of a carbon-coated ternary positive electrode material prepared according to first embodiment of the invention.

FIG. 1 is an XRD spectrum of a carbon-coated ternary positive electrode material prepared in the first embodiment. As can be seen from FIG. 1, the material composition obtained in the first embodiment is a carbon-coated ternary positive electrode material, and its spectrum is consistent with the standard spectrum of the carbon-coated ternary positive electrode material.

Figure 2:
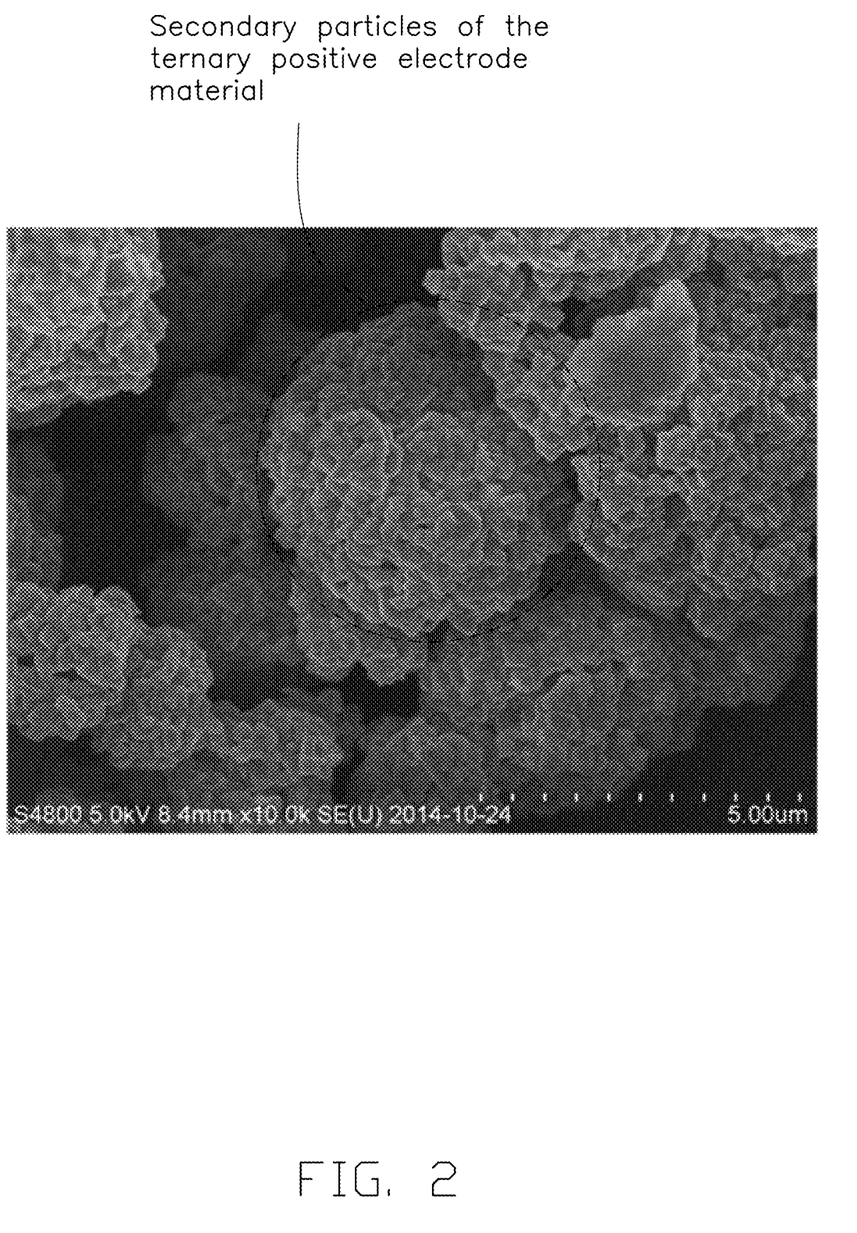
FIG. 2 is an SEM image of a 10,000-fold magnification of carbon-coated ternary positive electrode material prepared per the first embodiment of the invention.

FIG. 2 is an SEM image of a 10,000-fold magnified carbon-coated ternary positive electrode material prepared per the first embodiment. As can be seen from FIG. 2, the secondary particles of the carbon-coated ternary positive electrode material are spherical and have a particle size of 5 μm to 10 μm.

Figure 3:
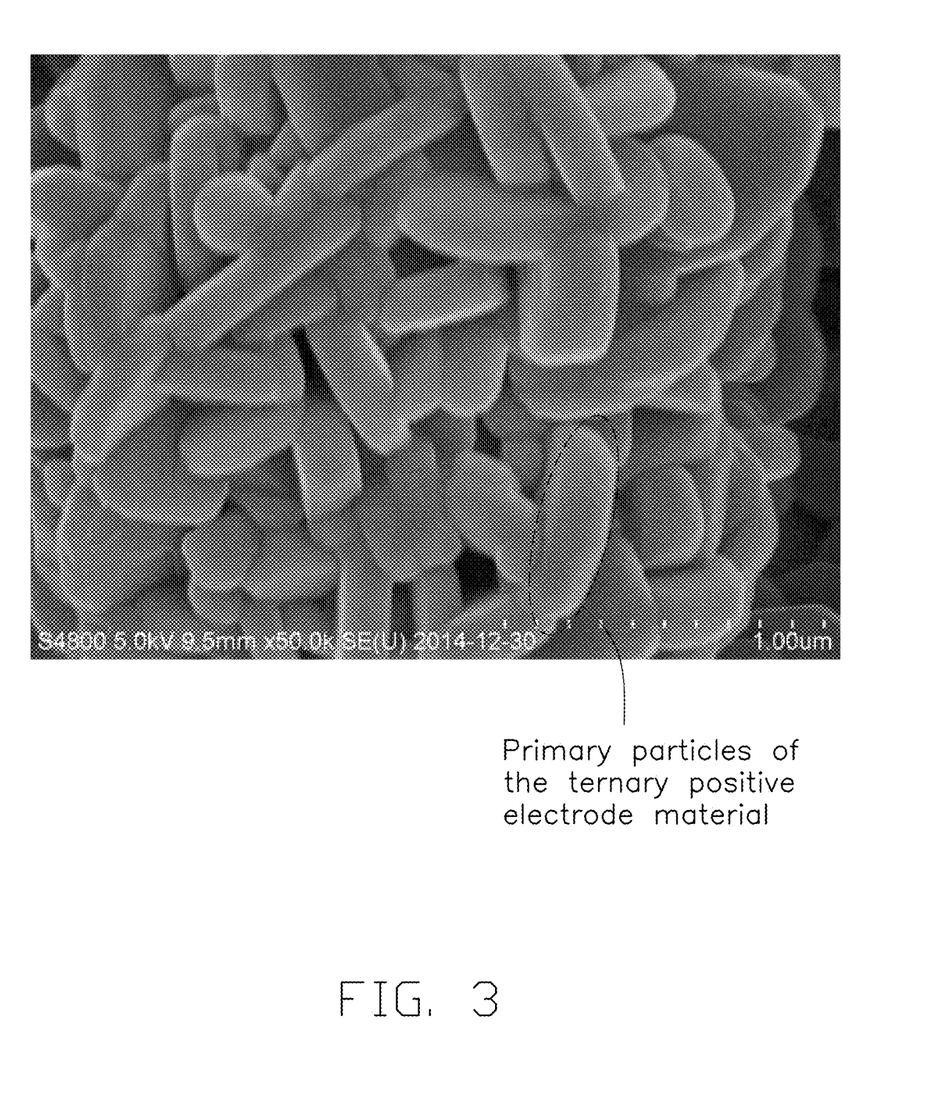
FIG. 3 is an SEM image of a 50,000-fold magnification of carbon-coated ternary positive electrode material prepared per the first embodiment of the invention.

FIG. 3 is an SEM image of a 50,000-fold magnified carbon-coated ternary positive electrode material prepared per the first embodiment. As can be seen from FIG. 3, the particle diameter of the primary particles of the carbon-coated ternary positive electrode material is 200 nm to 300 nm, and the shape is a regular sheet shape.

Figure 4:
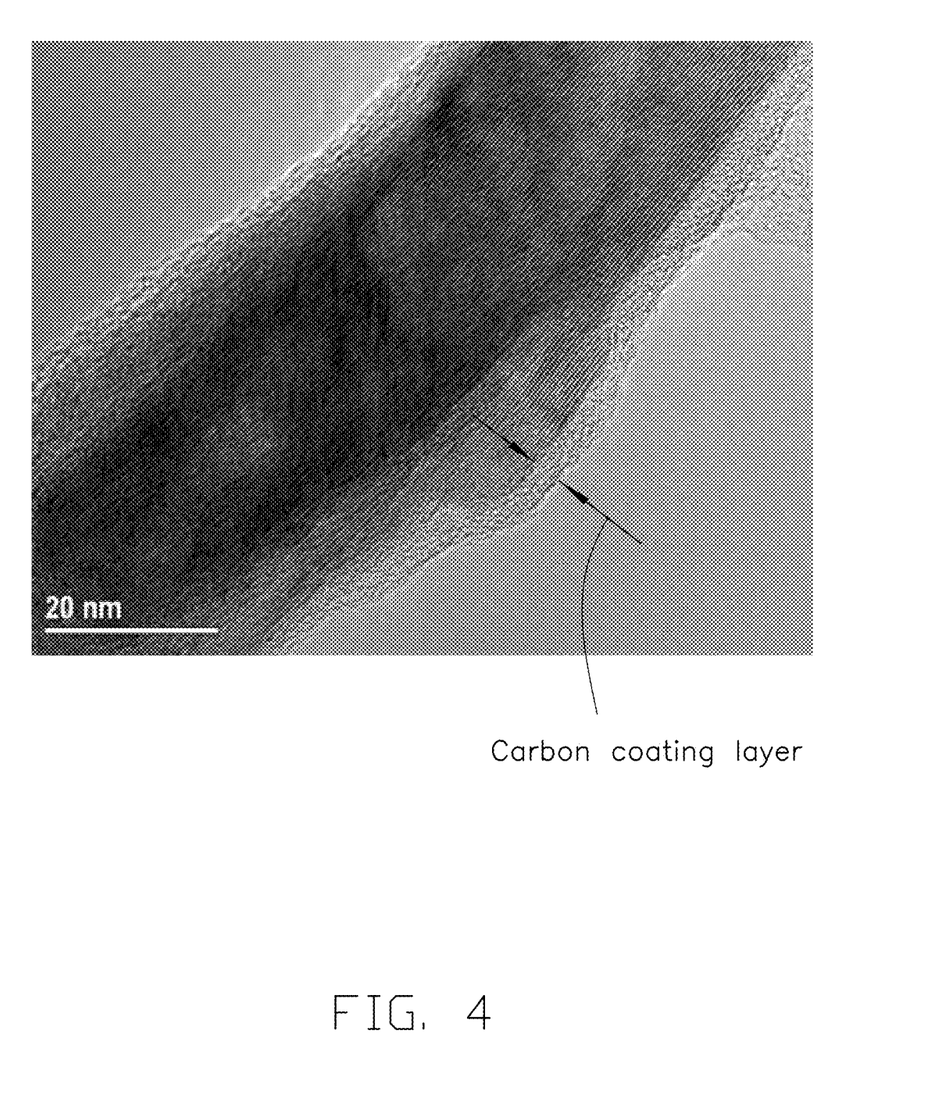
FIG. 4 is a TEM image of a carbon-coated ternary positive electrode material prepared per the first embodiment of the invention.

FIG. 4 is a TEM image of primary particles of a carbon-coated ternary positive electrode material prepared per the first embodiment. The material layer between the two arrows is a carbon coating layer, and the thickness of the carbon coating layer is about 5 nm.

Figure 5:
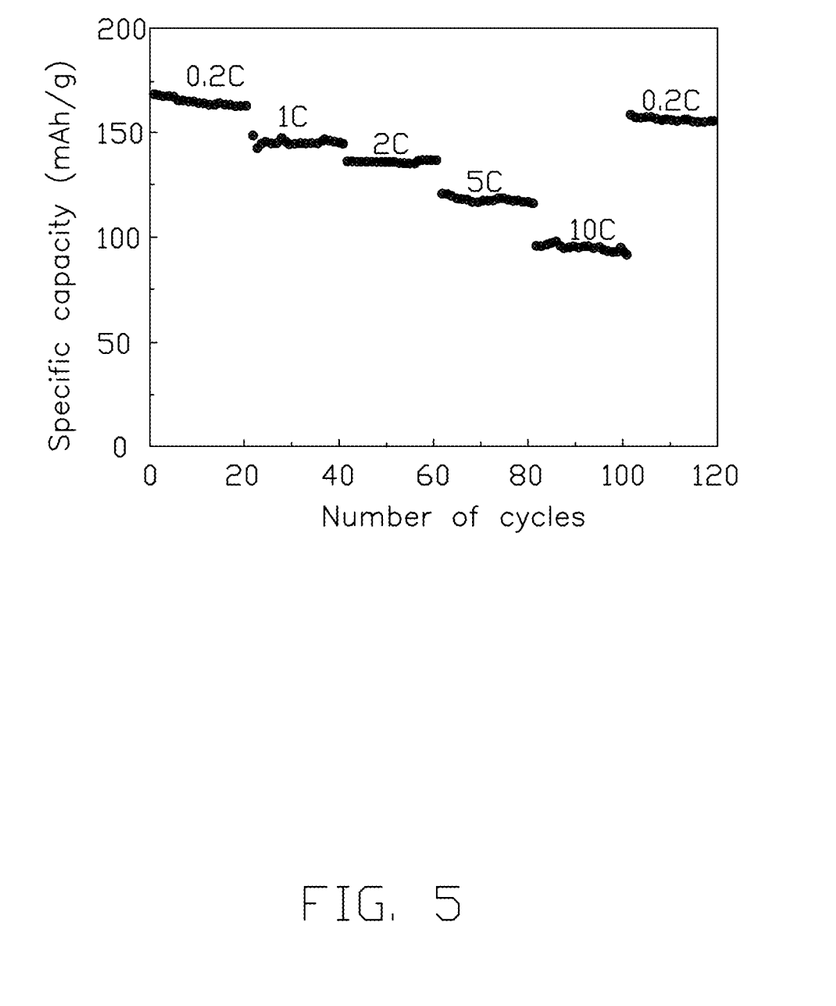
FIG. 5 is a cyclic performance curve of a carbon-coated ternary positive electrode material prepared per the first embodiment of the invention.

FIG. 5 is a cycle performance curve of the carbon-coated ternary positive electrode material prepared per the first embodiment as a positive electrode of a lithium ion battery. As can be seen from FIG. 5, the discharge specific capacities of the carbon-coated ternary positive electrode materials prepared in Example 1 at the rates of 0.2 C, 1 C, 2 C, 5 C, and 10 C are 168 mAh/g, 148.3 mAh/g, and 135.6 mAh/g, 120 mAh/g, 95.2 mAh/g, respectively. After rate cycling at a rate of 0.2 C, specific capacity still remains at about 160 mAh/g, indicating that the cycle performance of the carbon-coated ternary positive electrode material prepared in the first embodiment is good.

Figure 6:
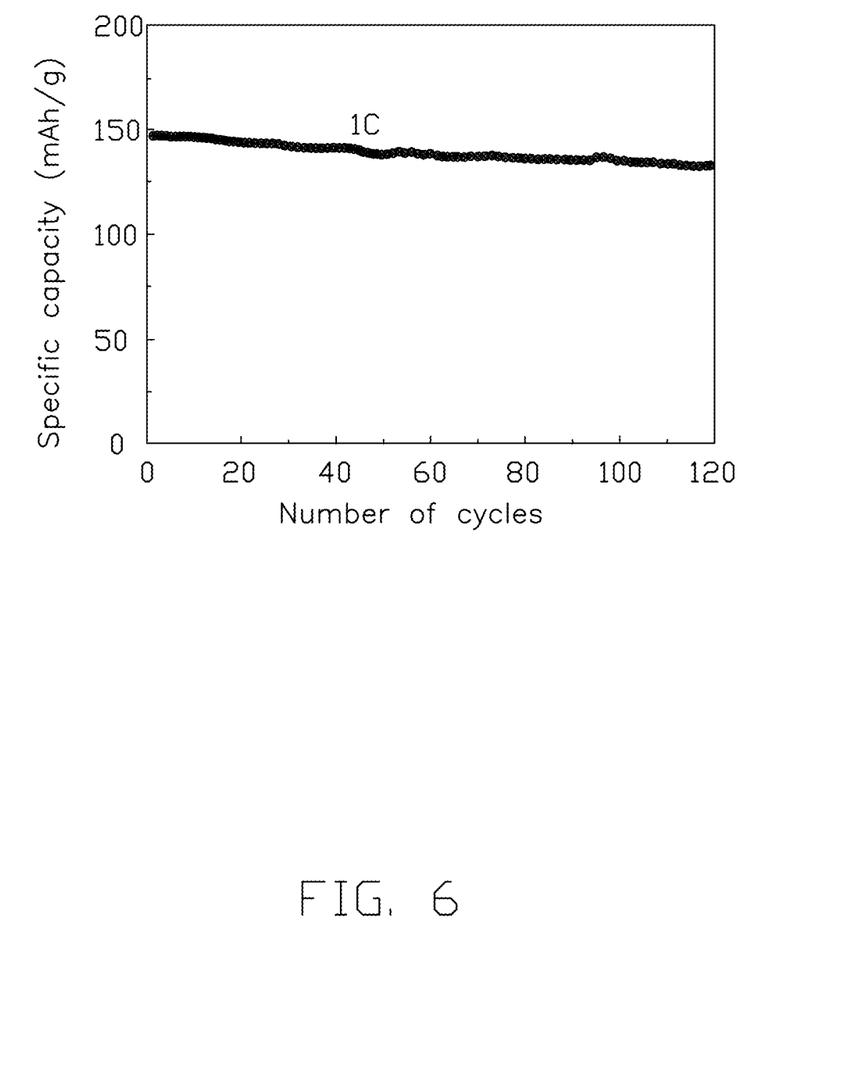
FIG. 6 is a charge/discharge rates performance curve of the carbon-coated ternary positive electrode material prepared per the first embodiment of the invention.

FIG. 6 is a rate of charge/discharge as a performance curve of the carbon-coated ternary positive electrode material prepared in the first embodiment. As can be seen from FIG. 6, the carbon-coated ternary positive electrode material prepared in the first embodiment was subjected to a charge and discharge cycle with a current of 1 C under normal temperature and pressure, and initial discharge capacity was 145.7 mAh/g. The discharge capacity was 131.7 mAh/g after 100 cycles, and the capacity retention rate was 90.2%. This indicates that the carbon-coated ternary positive electrode material prepared in the first embodiment has a good performance regarding rates. The carbon-coated ternary positive electrode material prepared in the first embodiment also has good electrochemical properties.

In a second embodiment, nickel sulphate, cobalt sulphate, and manganese sulphate are mixed with water in accordance with the molar ratio of Ni:Co:Mn=8:1:1 to prepare a 300 mL metal salt aqueous solution with concentration of 1 mol/L.

Polyvinyl pyrrolidone is added to the above aqueous metal salt solution, and stir the solution until is stirred polyvinyl pyrrolidone is completely dissolved. Wherein, the mass of polyvinyl pyrrolidone is 3% of the mass of $Ni_{1-x-y}Co_xMn_y(OH)_2$ synthesized from the metal salt aqueous solution.

A mixed solution of 300 mL of sodium hydroxide and ammonia water is prepared. The concentration of sodium hydroxide in the mixed solution is 2 mol/L, and the concentration of ammonia water is 4 mol/L.

At a temperature of 28° C. and under argon protection, the metal salt solution with polyvinyl pyrrolidone, the mixed solution of sodium hydroxide solution and ammonia water are slowly added in a reaction vessel by a peristaltic pump to react for 12 hours, to obtain a nickel-cobalt-manganese coprecipitate.

The nickel-cobalt-manganese coprecipitate is washed with ethanol to a ternary positive electrode material precursor.

The ternary positive electrode material precursor is formulated into a suspension of 200 mL of a ternary positive electrode material precursor, wherein the mass percentage concentration of the ternary positive electrode material precursor in the suspension is 8%.

Stir the suspension of the ternary positive electrode material precursor, and add lithium acrylate to the suspension of the ternary positive electrode material precursor at a molar ratio of Li:(Ni+Co+Mn)=1.05:1.

Add ammonium persulfate to the suspension of the ternary positive electrode material precursor with lithium acrylate at a temperature of 60° C., and then stir the suspension. The lithium acrylate undergoes polymerisation reaction for 8 hours, to obtain a suspension of a lithium polyacrylate-coated ternary positive electrode material precursor, wherein the mass of ammonium persulfate is 5% of the mass of lithium acrylate.

Dry the suspension of the lithium polyacrylate-coated ternary positive electrode material precursor, and obtain spherical lithium polyacrylate coated ternary positive electrode material precursor particles.

Sinter lithium polyacrylate-coated ternary positive electrode material precursor particles under argon gas at a temperature of 500° C. for 6 hours, and then sinter in the air at a temperature of 1000° C. for 20 hours, to obtain a carbon-coated ternary positive electrode material.

Those skilled in the art can make other changes and modifications according to the technical idea of the present disclosure, all such changes and modifications fall within the protective scope of the claims of the present disclosure.

What is claimed is:

1. A method for preparation of a carbon-coated ternary positive electrode material, chemical formula of ternary positive electrode material is $LiNi_{1-x-y}Co_xMnyO_2$, wherein $0<x\leq0.4$, $0<y\leq0.3$, the preparation method includes the steps:

preparing nickel-cobalt-manganese coprecipitate as a ternary positive electrode material precursor by reacting nickel salt, cobalt salt and manganese salt;

preparing a suspension of the ternary positive electrode material precursor, the mass percentage concentration of the ternary positive electrode material precursor in the suspension being 5%-30%;

adding lithium acrylate to the suspension of the ternary positive electrode material precursor according to the molar ratio of Li:(Ni+Co+Mn) being 1.03-1.05: 1;

at a temperature of 50° C.–80° C., adding ammonium persulphate to the lithium acrylate-containing suspension of the ternary positive electrode material precursor to make the lithium acrylate undergo polymerisation reaction, and obtaining a suspension of a lithium polyacrylate-coated ternary positive electrode material precursor, the mass of the ammonium persulphate being 2%-10% of the mass of the lithium acrylate, the reaction time being 5-8 hours;

drying the suspension of the lithium polyacrylate-coated ternary positive electrode material precursor, and obtaining spherical particles;

sintering the lithium polyacrylate-coated ternary positive electrode material precursor particles, and obtaining a carbon-coated ternary positive electrode material.

2. The preparation method for a carbon-coated ternary positive electrode material of claim 1, wherein the step "preparing a ternary positive electrode material precursor" specifically includes:

a nickel salt, a cobalt salt, and a manganese salt are prepared into an aqueous metal salt solution according to a molar ratio of Ni:Co:Mn=(1-x-y):x:y, wherein $0<x\leq0.4$, $0<y\leq0.3$, and the concentration of the aqueous metal salt solution is 0.01 mol/L~1 mol/L;

adding a surfactant to the aqueous metal salt solution, wherein the mass of the surfactant is 1% to 10% of the mass of $Ni_{1-x-y}Co_xMny(OH)_2$ synthesized from the aqueous metal salt solution;

at a temperature of 25° C. to 50° C. and under inert gas protection, the metal salt solution with the added surfactant, a sodium hydroxide solution, and an ammonia solution are mixed and reacted to obtain a precipitate, wherein the molar ratio of each component is $(Ni^{2+}+C^{2+}+Mn^{2+}): OH^-:NH^{4+}=1:2:2$, and the reaction time is 2-12 hours;

and washing the coprecipitate with deionized water or ethanol to obtain a ternary positive electrode material precursor.

3. The preparation method for a carbon-coated ternary positive electrode material of claim 2, wherein the nickel salt may be selected from one or more of nickel sulfate, nickel acetate and nickel nitrate, the cobalt salt may be selected from one or more of cobalt sulfate, cobalt acetate and cobalt nitrate, and the manganese salt may be selected from one or more of manganese sulfate, manganese acetate and manganese nitrate.

4. The preparation method for a carbon-coated ternary positive electrode material of claim 2, wherein the surfactant may be selected from one or more of polyvinylpyrrolidone, polyethylene glycol and cetyltrimethylammonium chloride.

5. The preparation method for a carbon-coated ternary positive electrode material of claim 2, wherein the step "at a temperature of 25° C. to 50° C. and under inert gas protection, the metal salt solution with the added surfactant, a sodium hydroxide solution, and an ammonia water mixed and reacted to obtain a precipitate" further includes:
the mixed solution of surfactant-containing metal salt aqueous solution, sodium hydroxide solution, and ammonia solution is sonicated.

6. The preparation method for a carbon-coated ternary positive electrode material of claim 1, wherein the drying method in the step "drying the suspension of the lithium polyacrylate-coated ternary positive electrode material precursor" is spray drying.

7. The preparation method for a carbon-coated ternary positive electrode material of claim 1, wherein the step "sintering the lithium polyacrylate-coated ternary positive electrode material precursor particles, and obtaining a carbon-coated ternary positive electrode material" specifically includes:
lithium polyacrylate-coated ternary positive electrode precursor particles are pre-sintered in inert gas atmosphere at a temperature of 300° C. to 500° C. for 3 to 12 hours, and then sintered in air and at a temperature of 700° C. to 1000° C. for 12 to 24 hours.

* * * * *